(12) United States Patent
McCann et al.

(10) Patent No.: US 9,152,299 B2
(45) Date of Patent: Oct. 6, 2015

(54) ACTIVITY MANAGEMENT TOOL

(75) Inventors: William Jon McCann, Baltimore, MD (US); Jeremy Gray Perry, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 541 days.

(21) Appl. No.: 12/576,201

(22) Filed: Oct. 8, 2009

(65) Prior Publication Data

US 2011/0087989 A1     Apr. 14, 2011

(51) Int. Cl.
*G06F 3/0481*     (2013.01)
*G06F 3/0482*     (2013.01)
*G06F 9/48*     (2006.01)

(52) U.S. Cl.
CPC .......... *G06F 3/0482* (2013.01); *G06F 3/04817* (2013.01); *G06F 9/4843* (2013.01); *G06F 2209/482* (2013.01)

(58) Field of Classification Search
CPC ................ G06F 3/0481; G06F 3/0482; G06F 2203/04803
USPC .......... 715/781, 783, 788, 789, 790, 792, 802
See application file for complete search history.

(56) References Cited

U.S. PATENT DOCUMENTS

| | | | | |
|---|---|---|---|---|
| 2004/0066414 A1* | 4/2004 | Czerwinski et al. | .......... | 345/781 |
| 2004/0085328 A1* | 5/2004 | Maruyama et al. | ........... | 345/619 |
| 2004/0261038 A1* | 12/2004 | Ording et al. | ................. | 715/792 |
| 2005/0021336 A1* | 1/2005 | Katsuranis | ..................... | 704/246 |
| 2005/0235220 A1* | 10/2005 | Duperrouzel et al. | ........ | 715/788 |
| 2006/0075348 A1* | 4/2006 | Xu et al. | ........................ | 715/730 |
| 2006/0184895 A1* | 8/2006 | Dolph | ............................ | 715/790 |
| 2006/0224991 A1* | 10/2006 | Stabb et al. | .................... | 715/781 |
| 2007/0124696 A1* | 5/2007 | Mullender et al. | ............. | 715/781 |
| 2008/0184158 A1* | 7/2008 | Selig | ............................. | 715/781 |
| 2009/0070713 A1* | 3/2009 | Whitman et al. | ............... | 715/854 |
| 2009/0106698 A1* | 4/2009 | Hansen et al. | ................ | 715/838 |
| 2009/0199128 A1* | 8/2009 | Matthews et al. | ............. | 715/799 |

OTHER PUBLICATIONS

Red Hat Office Action for U.S. Appl. No. 12/576,215, mailed Nov. 4, 2011.
Red Hat Office Action for U.S. Appl. No. 12/576,215, mailed Feb. 14, 2012.
Red Hat Office Action for U.S. Appl. No. 12/576,215, mailed Jul. 25, 2013.
Red Hat Office Action for U.S. Appl. No. 12/576,215, mailed Jan. 16, 2014.

* cited by examiner

*Primary Examiner* — Rashawn Tillery
(74) *Attorney, Agent, or Firm* — Lowenstein Sandler LLP (57) ABSTRACT

A method for providing an activity management tool includes receiving a user request for an activity overview, identifying currently running applications, applications that are likely to be run in the future, and open windows of the currently running applications. The method further includes presenting an activity overview graphical user interface (GUI) having a first area and a second area. The first area includes visual indicators of the currently running applications and the applications likely to be run in the future. The second area includes the open windows of the currently running applications, where the open windows are resized and positioned in such a way as to be simultaneously viewable by the user.

20 Claims, 10 Drawing Sheets

ACTIVITY MANAGEMENT TOOL

RELATED APPLICATON

The present application is related to co-filed U.S. patent application Ser. No. 12/576,215, entitled "Workspace Management Tool".

TECHNICAL FIELD

Embodiments of the present invention relate to operating systems. Specifically, embodiments of the invention relate to an activity management tool supported by an operating system.

BACKGROUND

The increased processing power of personal computers allows users to perform multiple tasks simultaneously. Such multitasking can occur in a single application (e.g., launching multiple instances of a web browser) or across multiple applications. In window-based operating systems, each currently running application may have one or more windows open to execute tasks desired by the user. Hence, the user may have a significant number of windows (e.g., 10-15 windows) opened at the same time. Navigation between such a large number of windows can be confusing and disruptive.

One existing approach deals with the above problem by presenting currently open windows in a reduced form so that they can all fit on a single screen. While this approach helps the user to navigate between currently opened windows, it has several limitations. For example, the above approach does not present to a user an overview of all available activities and/or active work spaces when the user is viewing open windows associated with current activities. Neither does the above approach allow the user to add new activities and/or organize new and existing activities onto separate work spaces while viewing open windows of the existing activities, etc.

Accordingly, there is a need for an efficient tool that can provide an integrated digital work environment for a user.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for providing an activity management tool are described herein. In one embodiment, in response to a user request for an activity overview, an operating system identifies currently running applications, applications that are likely to be run in the future, and open windows of the currently running applications. Based on this information, an activity overview graphical user interface (GUI) is created and presented on a display device of the computing system. The activity overview GUI has a first area and a second area. The first area includes visual indicators (e.g., icons) of the currently running applications and the applications likely to be run in the future. The second area includes the open windows of the currently running applications, where the open windows are resized and positioned in such a way as to be simultaneously viewable by the user. The activity overview GUI may also provide various other functionality pertaining to available activities and currently open windows. For example, the activity overview GUI may allow a user to view the state of current activities, switch between current activities, add new activities, navigate between currently open windows, add new windows for current activities, etc.

Figure 1:
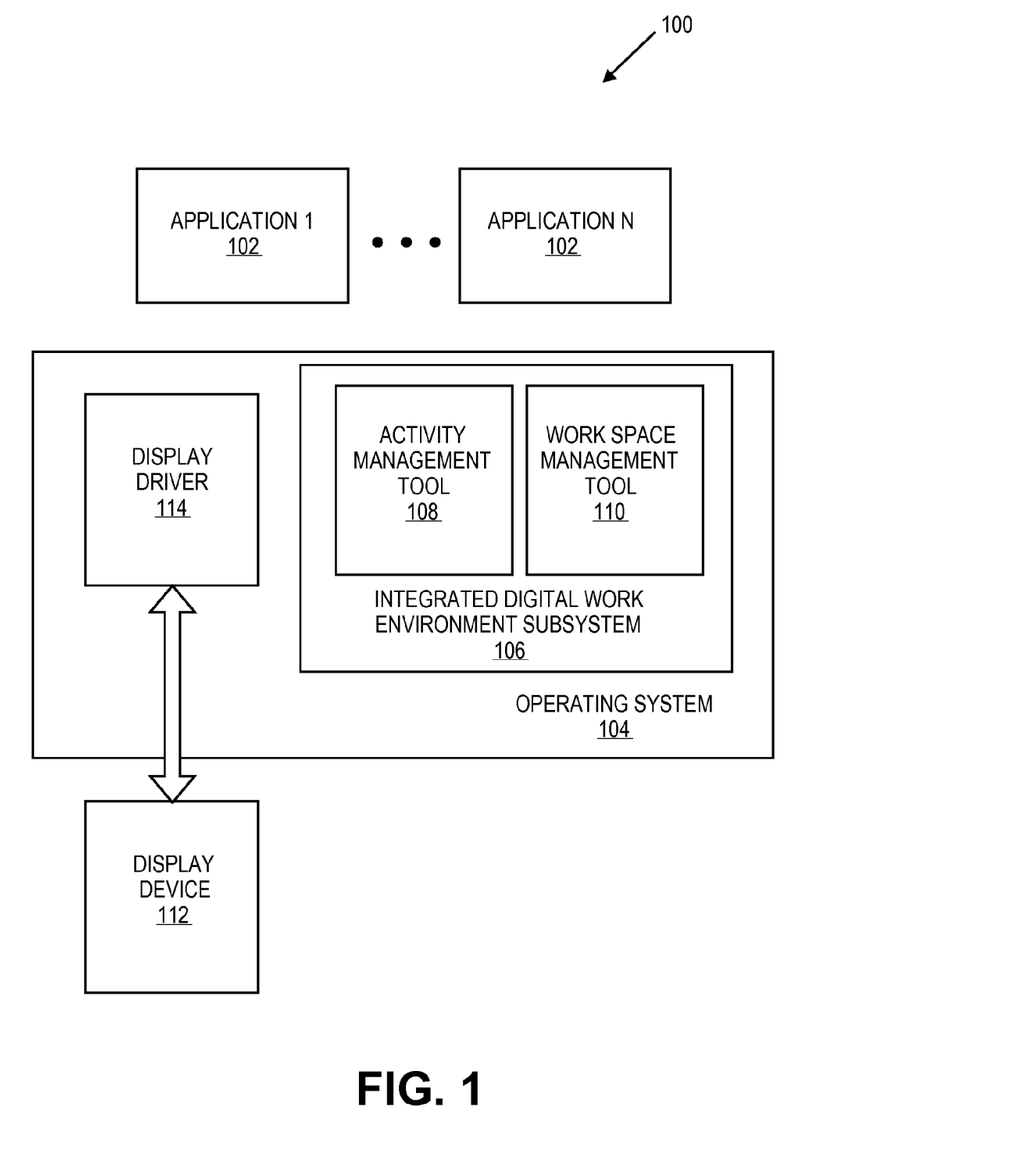
FIG. 1 is a block diagram of one embodiment of a personal activity/workspace management system.

FIG. 1 is a diagram of one embodiment of a personal activity/workspace management system 100 that may be part of a computing system such as a client computer (e.g., a personal computer, a laptop, a PDA, a mobile phone, etc.), a server computer, etc. System 100 includes an operating system (e.g., Linux OS, Windows® OS, etc.), applications 102 running on top of the operating system 104, and a display device 112 that displays data generated by the applications 102 and the operating system 104. The display device 112 may be, for example, a liquid crystal display (LCD), a cathode ray tube (CRT), or any other device capable of displaying data. The operating system 104 communicates with the display device 112 via a display driver 114 that may be part of the operating system 104 or an independent component. In particular, when an application 102 has data to display to the user, it sends a request to the operating system 104, requesting a window for the presentation of the data. The operating system then sends instructions to a display driver 114 to create the structure of the window on the display device 112, and informs the application 102 of the area within which its data can be displayed.

If multiple applications 102 are running concurrently, then several windows associated with these applications 102 may be displayed. At any given time, one of these windows is the active window, namely the window which pertains to the current task and receives user input. While having multiple windows simultaneously open on the display provides the user with instantaneous access to the information associated with a number of different tasks, such a display may also create confusion and disruption in the user experience. For example, multiple open windows can make it harder for the user to keep track of all current activities, may inhibit the user's ability to navigate to a particular item of information that is desired, etc. In one embodiment, the operating system 104 includes a subsystem 106 that addresses the above issues by providing an integrated digital work environment which significantly improves the user experience with respect to visualizing the user current activities, starting new activities, organizing user activities onto different workspaces, and switching between current activities and/or workspaces. In one embodiment, the subsystem 106 includes an activity management tool 108, which is directed to activity-related functionality, and a workspace management tool 110, which is directed to work-space related functionality. In another embodiment (not shown), the subsystem 106 integrates activity management and workspace management into a single tool.

Figure 2:
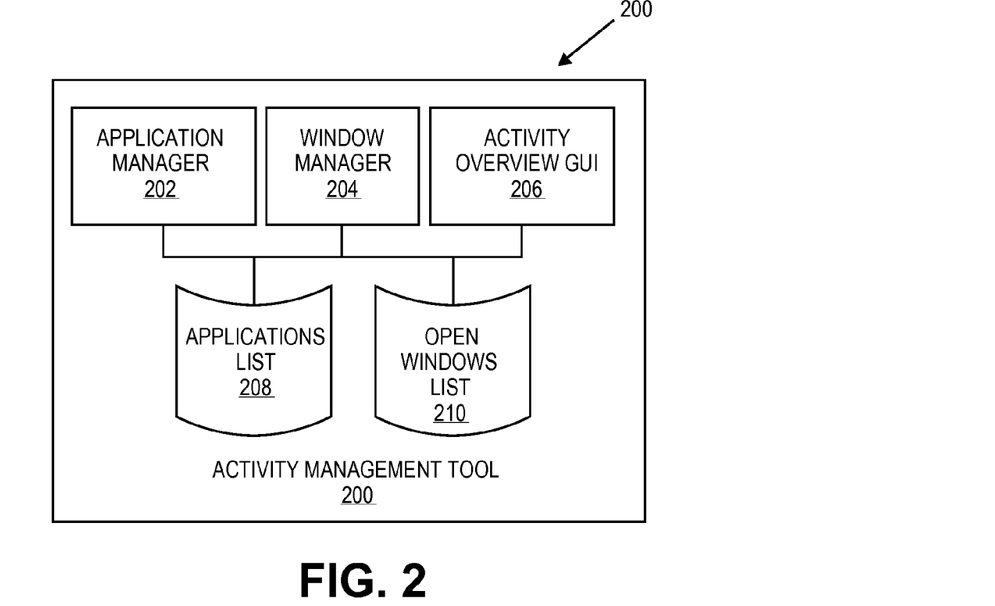
FIG. 2 is a block diagram of one embodiment of an activity management tool.

FIG. 2 is a block diagram of one embodiment of an activity management tool 200. The activity management tool 200 may include an application manager 202, a window manager 204 and an activity overview GUI 206. The application manager 202 identifies favorite applications of a user and records them in a list 208. In one embodiment, the application manager 202 identifies favorite applications based on user input. Alternatively, the application manager 202 identifies favorite activities by automatically determining most frequently used applications based on history data (e.g., history data collected daily, monthly, etc.) and periodically updating the list 208. In addition, the application manager 202 determines the current state of each application and stores this information in the list 208. The current state of an application may be, for example, an active (currently running) state, inactive state, active state with messages (e.g., email or text messages), active state with an urgent event (e.g., a calendar reminder), etc.

In one embodiment, the application manager 202 also collects information on user places (e.g., folders, storage devices, etc.) and/or user recent documents. The application manager 202 may store this data in the application list 208 or a separate data store (not shown).

The window manager 204 identifies open windows of applications and stores this information in an open window list 210. Each window in the list 210 is associated with a relevant application. In other words, the window manager 204 maintains up-to-date information on open windows in the list 210 with an indication of a currently active window.

The activity overview GUI 206 presents an overview of available activities to the user based on information in the application list 208 and the open window list 210. The activity overview GUI 206 is invoked in response to a user request. The user request may be generated when the user activates a hardware menu button, a designated keyboard key or a designated control (e.g., a specific link) on the screen, or a designated region (e.g., a hot-corner region) on the screen. In one embodiment, when the activity overview GUI 206 is launched, a transition from a currently active window is animated to make the user feel as if he or she is taking a step back to gain a wider view of the activities available on the user's computer system. The animation may be based on a physical model (e.g., slow start and stop).

The activity overview GUI 206 includes an activity area and a windowing area. The windowing area displays all open windows. The windows are reduced in size and positioned without a significant overlap to allow the user a simultaneous viewing of all the windows. The activity area includes visual indicators of available applications that may or may not be currently running. A visual indicator illustrates a function or a brand of the application and provides an indication of the application state (e.g., inactive, active with a single open window, active with multiple open windows, active with messages, active with urgent events, etc.). Visual indicators can be used, for example, to launch respective applications, add a new window for a currently running application, bring the user to the most recently used window of the application, switch between current activities, etc. An exemplary activity overview GUI will be discussed in more detail below in conjunction with FIG. 4.

Figure 3:
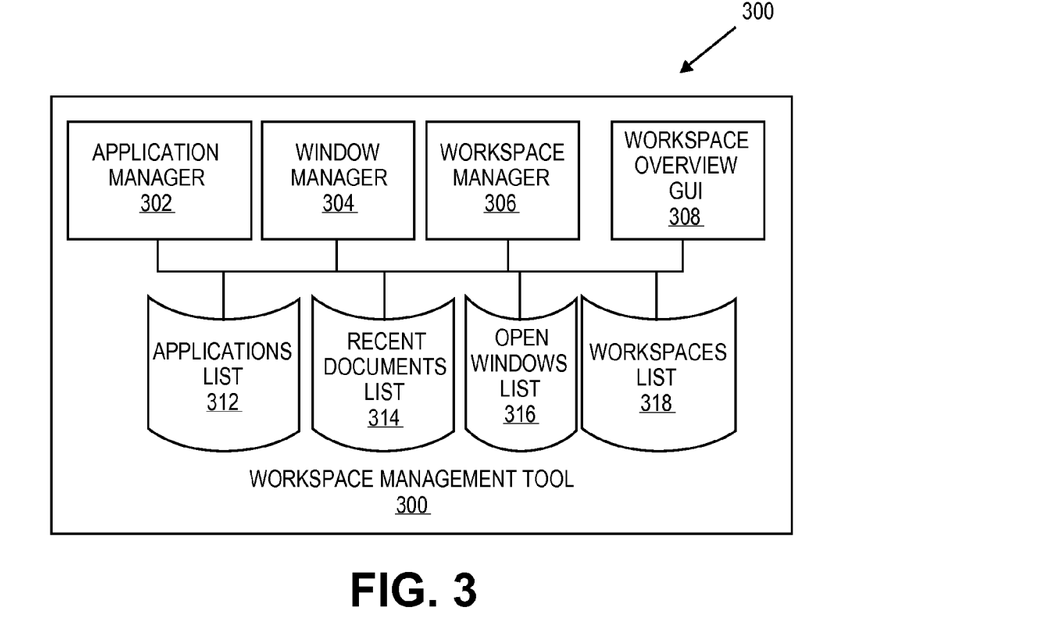
FIG. 3 is a block diagram of one embodiment of a workspace management tool.

FIG. 3 is a block diagram of one embodiment of a workspace management tool 300. The workspace management tool 300 may include an application manager 302, a window manager 304, a workspace manager 306, and a workspace overview GUI 308. The application manager 302 identifies favorite applications of a user and records them in a list 312. In one embodiment, the application manager 302 identifies favorite applications based on user input. Alternatively, the application manager 302 identifies favorite activities by automatically determining most frequently used applications based on history data (e.g., history data collected daily, monthly, etc.) and periodically updating the list 312. In addition, the application manager 302 determines the current state of each application and stores this information in the list 312.

In one embodiment, the application manager 302 also collects information on user places (e.g., folders, storage devices, etc.) and/or user recent documents. The application manager 302 stores this data in the recent documents list 314.

The window manager 304 identifies open windows of applications and stores this information in an open window list 316. Each window in the list 316 is associated with a relevant application and has an active window indicator specifying whether this window is currently active or not.

The workspace manager 306 identifies current workspaces of the user and stores this information in a workspaces list 318. Each workspace in the list 318 may be associated with one or more open windows and/or one or more items (e.g., recent documents or places).

The workspace overview GUI 308 presents an overview of user workspaces based on information in the applications list 312, recent documents list 314, open windows list 316 and workspaces list 318. The workspace overview GUI 308 is invoked in response to a user request. The user request may be generated when the user activates a hardware menu button, a designated keyboard key or a designated control (e.g., a specific link) on the screen, or a designated region (e.g., a hot-corner region) on the screen. In one embodiment, when the workspace overview GUI 308 is launched, a transition from a currently active window is animated to make the user feel as if he or she is taking a step back to gain a wider view of the user's workspaces.

The workspace overview GUI 308 has an activity area and a windowing area. The windowing area includes several regions, each region corresponding to a different workspace. Each workspace may have one or more open windows and/or one or more open items (places and documents). The windows and items are reduced in size and positioned without a significant overlap to allow the user a simultaneous viewing of all the windows and items. The activity area includes visual indicators of available applications that may or may not be currently running. A visual indicator of an application illustrates a function or a brand of the application and provides an indication of the application state. Visual indicators can be used, for example, to launch respective applications in different workspaces, add new windows for currently running applications in different workspaces, bring the user to the most recently used window of the application, switch between workspaces and current activities, etc.

In one embodiment, the activity area also includes visual indicators of places (e.g., folders, storage devices, etc.) and/or visual indicators of documents (e.g., recently used documents). A visual indicator of a place may illustrate the type of a place (e.g., a symbol of a folder or a storage device). A visual indicator of a document may illustrate the type of a file (e.g., a symbol of an application associated with the file). Visual indicators may be used to associate places and/or documents with different workspaces, connect to a place, open a document, etc. An exemplary workspace overview GUI will be discussed in more detail below in conjunction with FIG. 8.

It should be noted that the activity management tool 200 and/or the workspace management tool 300 may have more or less components than those shown in FIGS. 2 and 3. In addition, the components shown in FIGS. 2 and 3 may represent modules or sub-modules of the tools 200 and 300, or logical blocks of the tools 200 and 300.

In some embodiments, the activity management tool 200 and/or the workspace management tool 300 represent an Operating System Shell that may provide the desktop environment of the operating system, as well as the file management functionality of the operating system. The Shell may use accelerated video hardware (e.g., through Open Graphics Library (OpenGL)) to provide sophisticated layout and animations, including for example the zoom in and out animation of GUIs 206 and 308, scaling of window images in GUIs 206 and 308, use of transparency and sophisticated compositing features in GUIs 206 and 308, the ability to have live images of windows in GUIs 206 and 308, etc.

Figure 4:
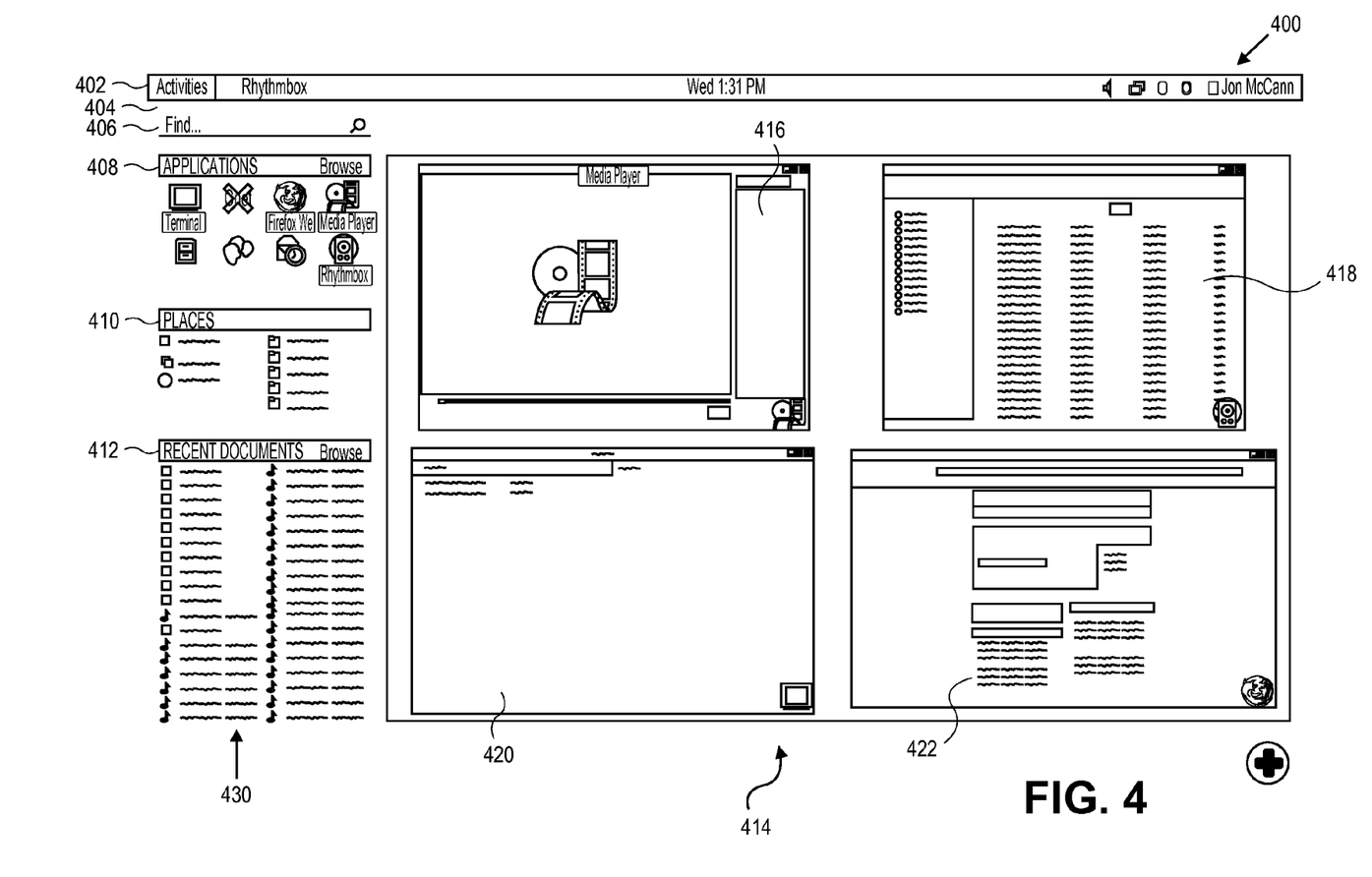
FIG. 4 illustrates an exemplary activity overview GUI, in accordance with some embodiments of the invention.

FIG. 4 illustrates an exemplary activity overview GUI 400, in accordance with some embodiments of the invention. GUI 400 may have a top menu bar with various items including, for example, Activities 402, Active Application, clock, etc. GUI 400 can be launched when the user activates (e.g., clicks) Activities 402 while interacting with a currently active window. Alternatively, when GUI 400 is shown, the user can click Activities 402 to leave the GUI 400 and return to the most recently used application. The Active Application item may show the most recently used application.

Region 404 representing the upper left corner of the Activities item 402 and the screen is known as a "hot corner." Moving the pointer into region 404 may automatically activate the Activities item 402, launching the GUI 400 or returning to the most recently used application. In addition to the hot corner 404 and Activities 402, the GUI 400 may be launched when the user presses a hardware menu button or a designated key on the keyboard.

Below region 404, there is a search region 404 allowing the user to enter a keyword and request a search by activating "Find" control.

Figure 5A:
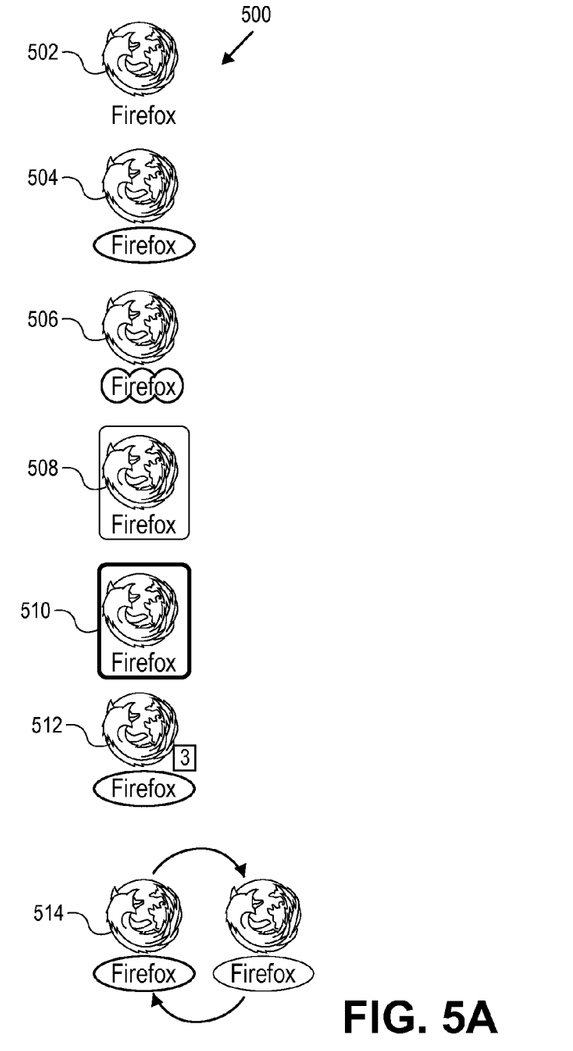
FIG. 5A illustrates exemplary visual indicators of applications, in accordance with some embodiments of the invention.

The GUI 400 also includes activity area 430 and windowing area 414. The activity area 430 may present visual indicators of the user's favorite applications 408. As shown, a visual indicator may include an icon illustrating the function or the brand of the application, and one or more additional graphical objects to illustrate the state of an active application. FIG. 5A illustrates exemplary visual indicators of applications, in accordance with some embodiments of the invention.

Referring to FIG. 5A, indicator 502 includes only an icon (without an additional graphical object) because the corresponding application is currently inactive. Indicator 504 includes an icon and an additional graphical object in the form of a name backlit with a single light source, illustrating that the corresponding application is active with a single open window. Indicator 506 includes an icon and a name backlit with multiple light sources, illustrating that the corresponding application is active with multiple open windows. Indicator 508 includes an icon with background, illustrating that the corresponding application is inactive but has a cursor positioned over its icon. Indicator 510 includes an icon surrounded by border, illustrating that the corresponding application is inactive but is a match result of a search performed in region 406. Indicator 512 includes an icon, a number and a name backlit with a single light source, illustrating that the corresponding application is active with a single window and one or more messages (as shown by the number). Indicator 514 includes an icon with a pulsing name highlight, illustrating that the corresponding application is active with a single window and an urgent window event.

Returning to FIG. 4, the windowing area 414 displays windows of currently active applications. In particular, area 414 includes windows 416, 418, 420 and 422 associated with applications 408 that have name backlit. The windows 416, 418, 420 and 422 are scaled down versions of the running application windows and they appear in a non-overlapping, tiled array to allow the user to identify and select windows in their running context. To facilitate identification, the fidelity of the original window is largely preserved in the scaled version. In addition, an application icon is displayed in the lower right corner of each scaled window, and a text label for the window appears when the pointer is placed over the window (window 416).

Figure 6:
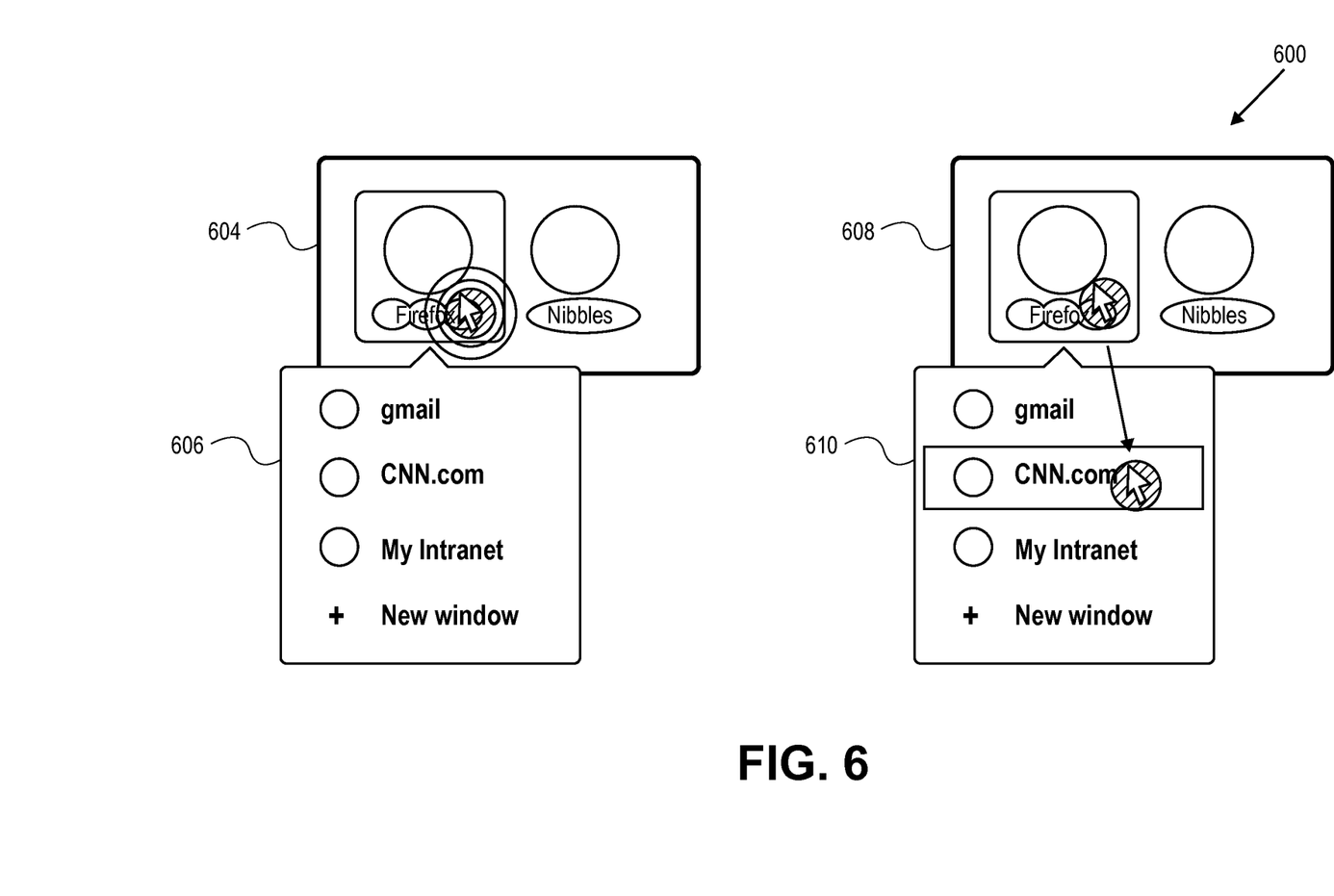
FIG. 6 illustrates an exemplary application menu, in accordance with some embodiments of the invention.

The user can manipulate the windowing area 414 using visual indicators 408. For example, a specific action with respect to an icon (e.g., clicking on an icon) of an inactive application launches the application and brings the user to the newly opened window of the application. In addition, a specific action with respect to an icon (e.g., clicking on an icon) of an active application, brings the user to the most recently used window of the application. Further, a designated action with respect to an item (e.g., clicking and holding the cursor on an item) brings an application menu. FIG. 6 illustrates an exemplary application menu, in accordance with some embodiments of the invention.

Referring to FIG. 6, application menu 606 is displayed when the user clicks icon 604 and holds the cursor on icon 604. Menu 606 includes a list of currently open windows of the applications. As the user moves through the list of windows in the menu 606, a corresponding window in the windowing area 414 is identified (e.g., by highlighting or increasing its size). As shown in 608, if the user releases the mouse button when the cursor is positioned over item 610, the window associated with the item 610 is activated. If the user releases the mouse button when the cursor is positioned over the application icon, the menu may be kept open until an item in the menu is selected or an area outside the menu is clicked. If a drag operation is initiated with respect to the application item while the menu is being shown, the menu may get closed and the drag operation may begin.

Returning again to FIG. 4, the region hosting the application icons 406 is referred to herein as applications well. The application icons 406 can be re-arranged in the applications well by the user. For example, the user can drag application icons within the applications well to spatially re-arrange the icons. An animation can be performed to illustrate the icon shifting and make it clear where the icon will be dropped.

Dragging application icons to another position or dragging a window from the windowing area 414 will move the application icon to that position where it will remain until moved or removed. This will implicitly add an application to the favorites list.

Figure 5B:
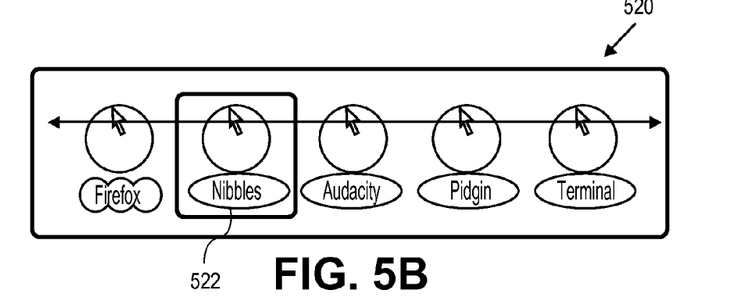
FIGS. 5B and 5C illustrate an exemplary application switching mechanism, in accordance with some embodiments of the invention.
Figure 5C:
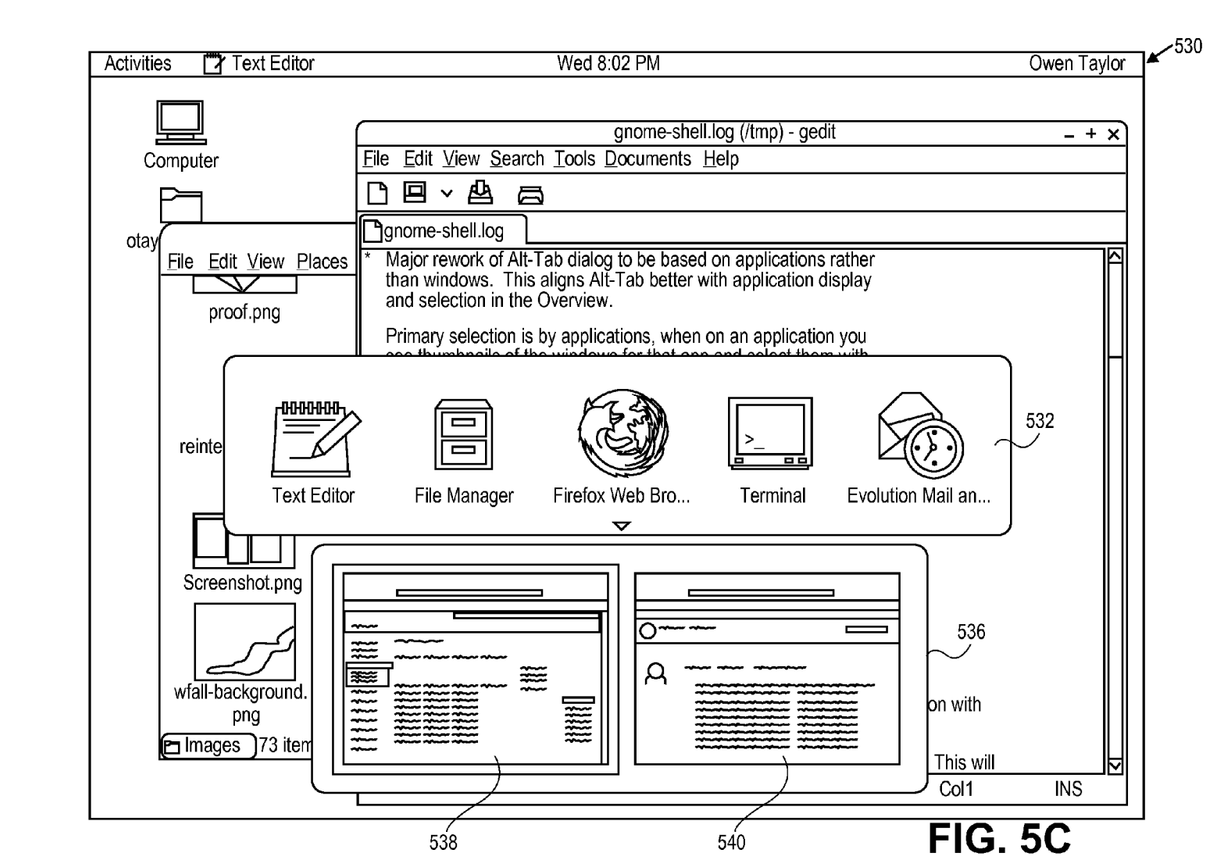

While viewing the GUI 400, the user may decide to switch between active applications. In one embodiment, an application switcher is invoked when the user presses designated keyboard keys (e.g., Alt-Tab). All active applications are then showed ordered by time of last use. FIGS. 5B and 5C illustrate an exemplary application switching window 520, in accordance with some embodiments of the invention.

Referring to FIG. 5B, the application switching window 520 includes one icon per application. The user can use the keyboard or mouse to switch between the application icons. In particular, the user can set the switcher focus using the mouse hover, which may be indicated using a shaded box around a corresponding application icon (e.g., icon 522).

Referring to FIG. 5C, when the selection focus pauses for a predefined time over the application icon, scaled down versions of all open windows become visible to the user. For example, box 536 may appear including windows 538 and 540 of application represented by icon 534.

Returning again to FIG. 4, the activity area 430 may further include visual indicators of places 410 and visual indicators of documents 412. By clicking on a document indicator, the user can open a window displaying the desired document. Opening this window will cause the user to leave the GUI 400. Various other operations can be performed with respect to icons 410 and 412.

The GUI 400 minimizes user disruption and facilitates user uninterrupted focus. It helps the user visualize his or her current activities while simplifying the addition of new activities. The GUI 400 further helps the user to track multiple open windows of an active application and to make a decision on opening a new window for this application. Once the user decides to open a new window for an application, the GUI 400 allows the user to do it in a simple and convenient manner.

Figure 7:
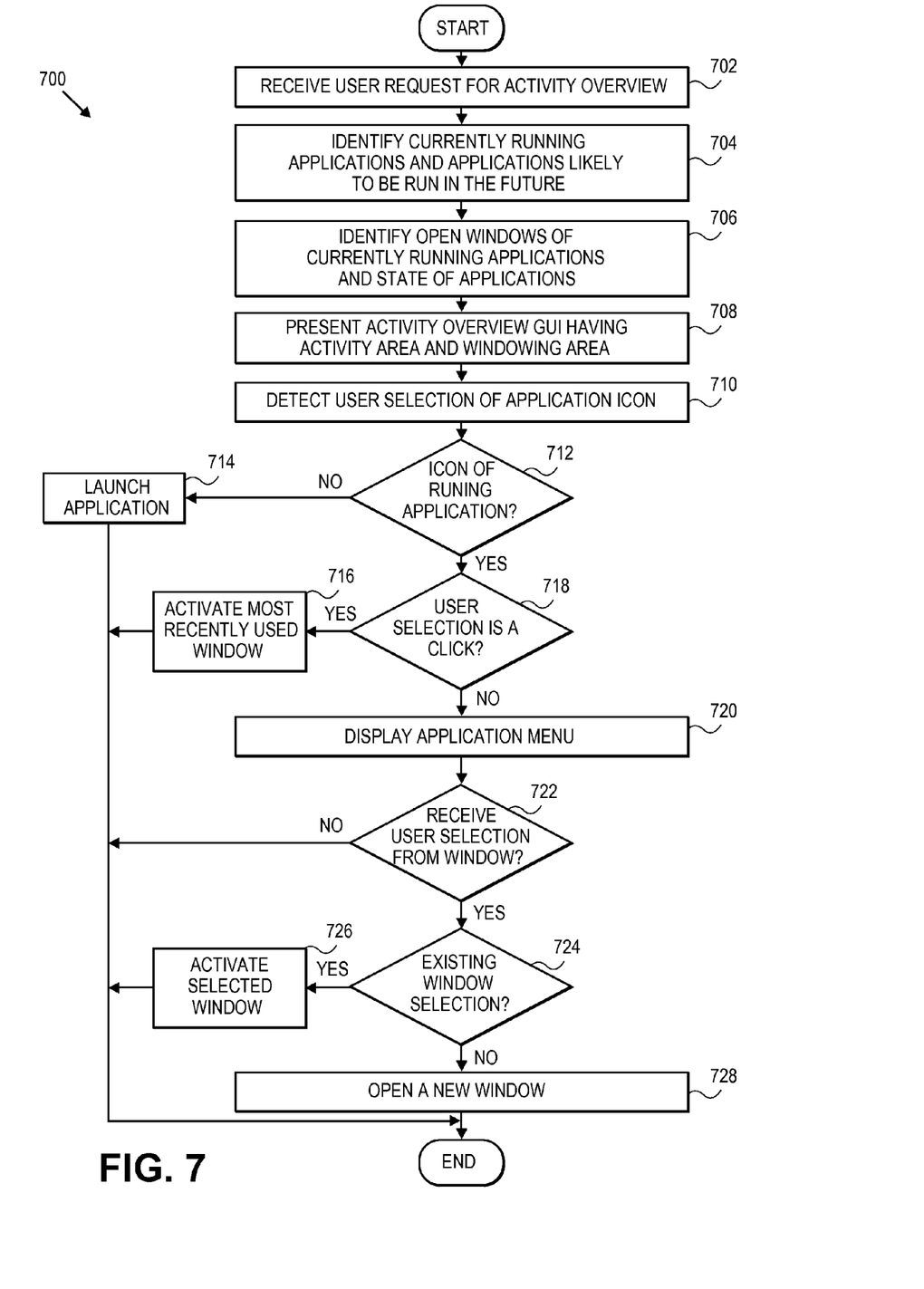
FIG. 7 is a flow diagram of one embodiment of a method for providing an activity management tool.

FIG. 7 is a flow diagram of one embodiment of a method 700 for providing an activity management tool. The method 700 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 700 is performed by a computing system (e.g., a computer hosting a personal activity/workspace management system 100 of FIG. 1).

Referring to FIG. 7, method 700 begins with processing logic receiving a user request for an activity overview (block 702). The user request may be received when the user presses a hardware menu button or a designated key on the keyboard, activates the Activities item in the top menu bar, or places the cursor in the top-corner region of the screen.

In response to the user request, processing logic identifies currently running applications and applications to be run in the future (block 704), identifies open windows of the currently running applications (block 706), and creates an activity overview GUI using information identified at blocks 704 and 706. At block 708, processing logic presents the activity overview GUI to the user. The activity overview GUI has an activity area and a windowing area. The activity area includes visual indicators of currently running applications and applications likely to be run in the future. The windowing area includes reduced versions of open windows of currently running applications. The visual indicators of the applications illustrate which applications are currently running, whether the currently running applications have more than one window open, etc.

At block 710, processing logic detects, via the activity overview GUI, a user selection of an application indicator (e.g., by clicking on the application indicator or by clicking and holding a cursor on the application indicator). At block 712, processing logic determines whether the selected application is currently running. If not, processing logic launches the selected application (block 714) by leaving the activity overview GUI and taking the user to an open window of this application. If so, processing logic further determines whether the user has selected the application by clicking on the application indicator in the activity overview GUI (block 718). If this determination is positive, processing logic activates the most recently used window of the application (block 716).

Alternatively, if the user has selected the application indicator by clicking the indicator and holding the cursor over the indicator in the activity overview GUI, processing logic displays the application menu for the selected application (block 720). Next, if the user makes a selection in the application menu (block 722), processing logic determines whether the user has selected an open window from the application menu (block 724). If so, processing logic activates the selected window (block 726). If not, processing logic opens a new window for this application (blocks 728).

Figure 8:
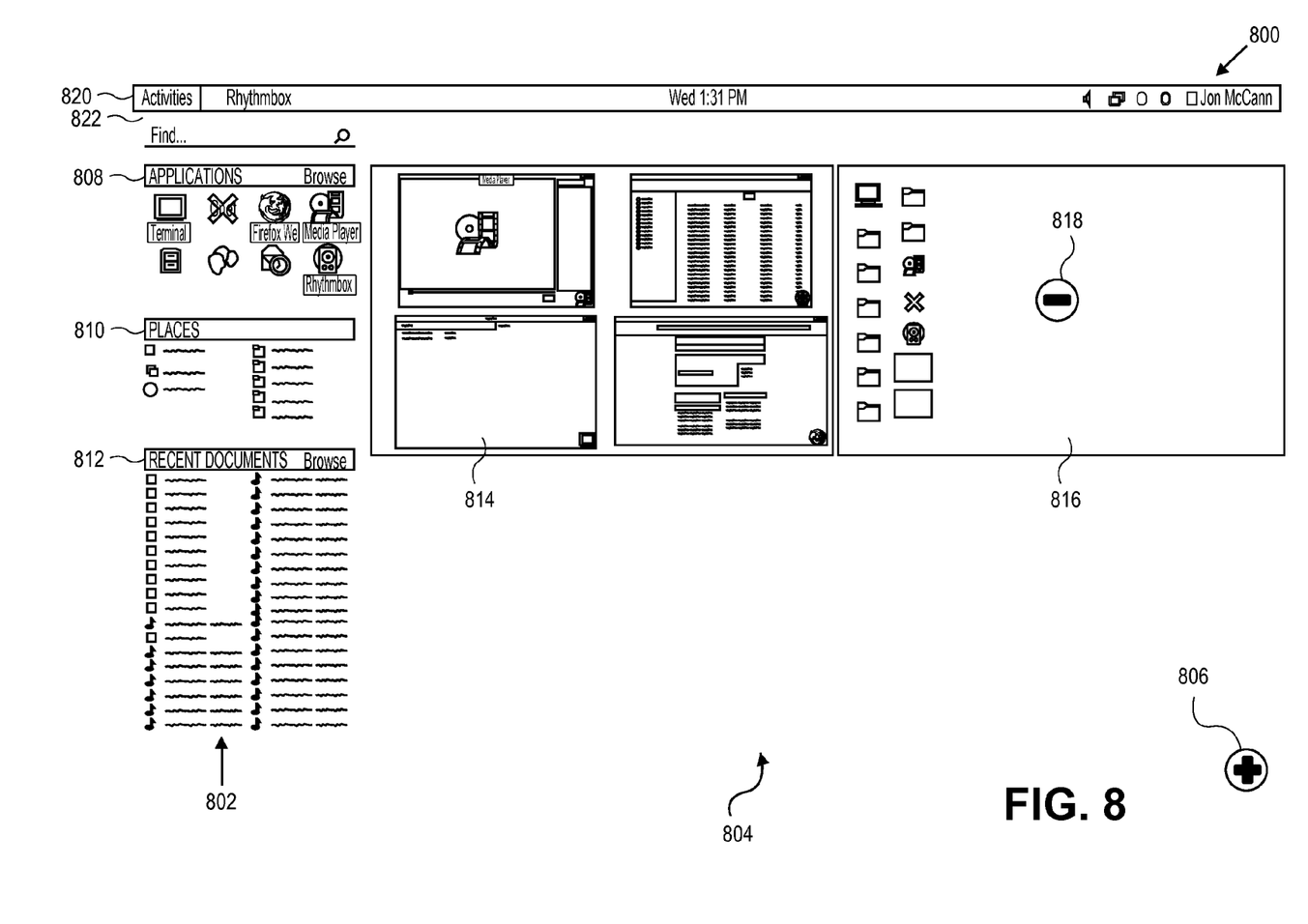
FIG. 8 illustrates an exemplary workspace overview GUI, in accordance with some embodiments of the invention.

FIG. 8 illustrates an exemplary workspace overview GUI 800, in accordance with some embodiments of the invention. GUI 800 may have a top menu bar with various items including, for example, Activities, Active Application, clock, etc. GUI 800 can be launched when the user activates (e.g., clicks) Activities while interacting with a currently active window. Alternatively, when GUI 800 is shown, the user can click Activities to leave the GUI 800 and return to the most recently used application. The Active Application item may show the most recently used application. In addition to Activities, the GUI 800 may be launched when the user moves the cursor to the hot corner region of the screen, or when the user presses a hardware menu button or a designated key on the keyboard.

The GUI 800 also includes activity/item area 802 and workspace area 804. The activity/item area 802 may present visual indicators of the user's favorite applications 808. As shown, a visual indicator may include an icon illustrating the function or the brand of the application, and one or more additional graphical objects to illustrate the state of an active application. Exemplary visual indicators of applications have been discussed in more detail below in conjunction with FIG. 5A. The activity/item area 802 further includes visual indicators of places 810 and visual indicators of documents 812.

The workspace area 804 includes several regions 814 and 816, each region representing a different workspace. Workspaces may be useful, for example, for spatial or logical arrangement of windows, to define a locality for a conceptual task, etc. For example, a user may have a workspace for paying bills, a workspace for work-related tasks, a workspace for online shopping, etc. Each workspace may include open windows of relevant applications, windows displaying relevant recent documents, and windows providing access to relevant places (e.g., folders or storage devices). The windows in each workspace are resized to fit within the corresponding region without significantly overlapping the other windows displayed in this region to allow the user to identify and select windows in the working space. To facilitate identification, the fidelity of the original window can be largely preserved in the scaled version. In addition, an application icon can be displayed in the lower right corner of each scaled window, and a text label for the window can appear when the pointer is placed over the window.

The user can add a new workspace using button 806. If a workspace has no windows, the workspace can be removed using button 818. The user can move windows from one workspace to another, which will automatically resize and reposition windows in the other workspace to avoid the overlap. The user can activate a workspace by clicking inside the workspace. This will cause the workspace region to occupy the entire screen.

The user can manipulate the workspaces 814 and 816 using visual indicators 808, 810 and/or 812. For example, dragging an icon of an application to a desired workspace adds a new window of the application to the workspace. Similarly, dragging an indicator of a document to a workspace, adds the document's window to the workspace. In another example, a specific action with respect to an icon (e.g., clicking on an icon) of an inactive application launches the application in the current workspace and brings the user to the newly opened window of the application. In addition, a specific action with respect to an icon (e.g., clicking on an icon) of an active application, brings the user to the most recently used window of the application in a relevant workspace. Further, a designated action with respect to an application icon (e.g., clicking and holding the cursor on an icon) brings an application menu that includes a list of currently open windows of the application. As the user moves through the list of windows in the menu, a corresponding window is identified in a workspace by increasing the size of the window. If the application has windows in multiple workspaces, windows in different workspaces are identified by increasing the size. If the user selects a window from the menu, the selected window is activated. If the user selects a new window option in the menu, a new window is added to the current workspace and activated in the current workspace.

The application icons 808 can be re-arranged in the applications well by the user. Dragging application icons to another position or dragging a window from the workspace will move the application icon to that position where it will remain until moved or removed. This will implicitly add an application to the favorites list.

While viewing the GUI 800, the user may decide to switch between active applications. In one embodiment, an application switcher is invoked when the user presses designated keyboard keys (e.g., Alt-Tab). All active applications from all the workspace are then showed ordered by time of last use, as discussed in more detail above.

Further, while viewing the GUI 800, the user may decide to switch between different workspaces by clicking on either an empty or unused section of the screen for that workspace, or clicking on an application window of interest on that workspace.

The GUI 800 helps the user to visualize his or her workspaces and to organize current activities and items (e.g., places and/or documents) onto different workspaces. It makes it easy for the user to add new activities or items to a desired workspace. The GUI 800 further helps the user to track multiple open windows of an active application even when these open windows are associated with different workspaces.

In some embodiments, GUI 400 of FIG. 4 and GUI 800 of FIG. 8 are provided by a single tool. In such embodiments, GUIs 400 and 800 provide combined activity and workspace management functionality, where GUI 400 provides an environment with a single workspace, and GUI 800 provides an environment with multiple workspaces. GUI 400 may include a button (similar to button 806) underneath the area 414 that may be activated to add a second workspace, which will result in dividing the area 414 into two regions (each associated with a different workspace), thus transforming GUI 400 into GUI 800. Similarly, when area 840 has two workspaces, the user may activate button 818 in the workspace 816 to remove the workspace 816, thus transforming the GUI 800 into the GUI 400.

Figure 9:
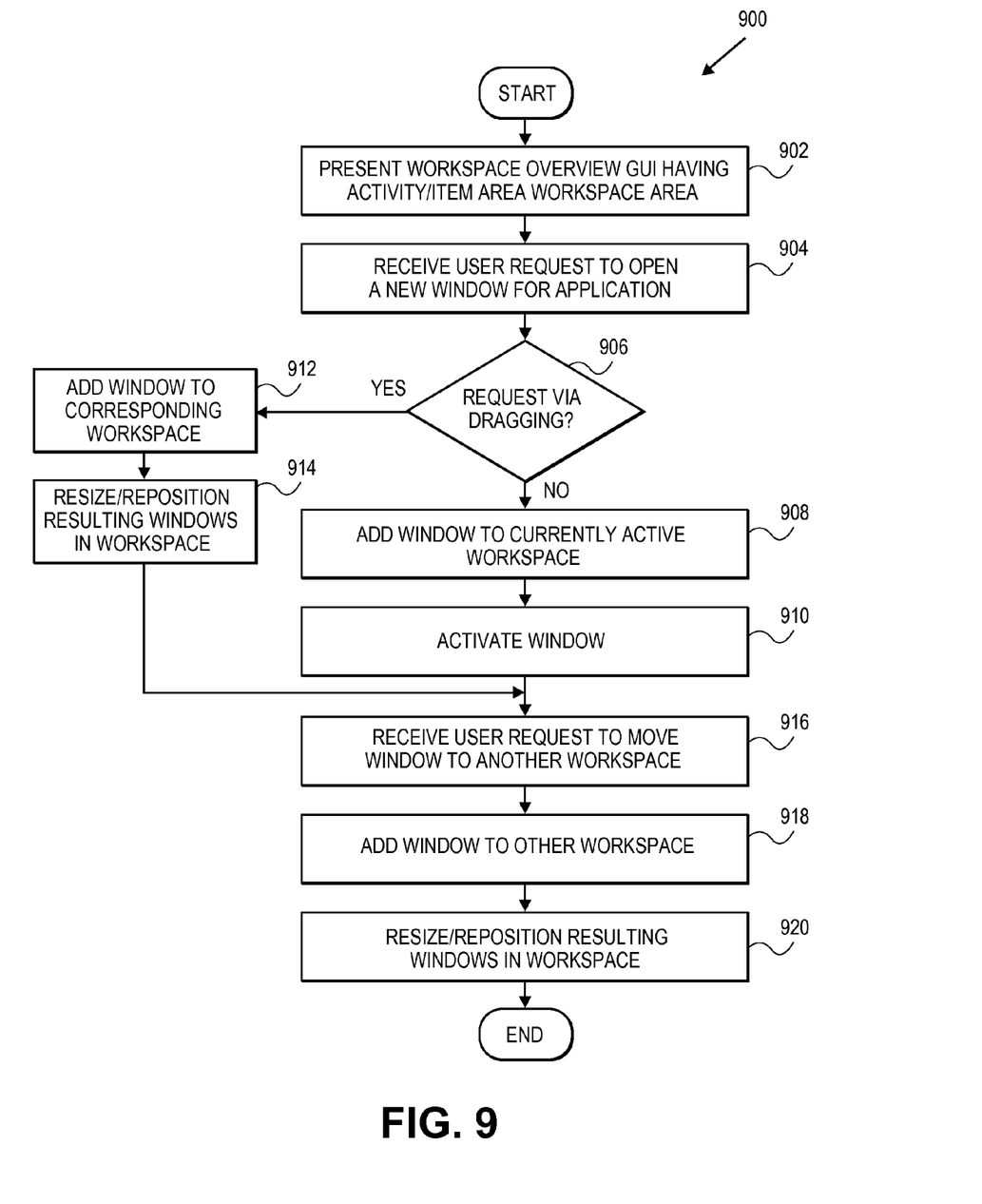
FIG. 9 is a flow diagram of one embodiment of a method for providing a workspace management tool.

FIG. 9 is a flow diagram of one embodiment of a method 900 for providing a workspace management tool. The method 900 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 900 is performed by a computing system (e.g., a computer hosting a personal activity/workspace management system 100 of FIG. 1).

Referring to FIG. 9, method 900 begins with processing logic presenting a workspace overview GUI having an activity/item area and a workspace area (block 902). The workspace overview GUI can be activated when the user presses a hardware menu button or a designated key on the keyboard, activates the Activities item in the top menu bar, or places the cursor in the top-corner region of the screen.

At block 904, processing logic receives, via the workspace overview GUI, a user request to open a new window for an application. If the user request is a drag operation (block 906), processing logic adds an open window for the application in a corresponding workspace (block 912), and then resizes and repositions the resulting windows in the workspace to allow easy identification and selection of the windows in this workspace (block 914).

If the user request is not a drag operation, then it is likely to be the user clicking on the icon of an inactive application or the user selecting a new window option in the application menu of an active application. In such cases, processing logic adds a new open window to the currently active workspace (block 908) and activates this window (block 910). Subsequently, the user returns to the workspace overview GUI.

At block 916, processing logic receives, via the workspace overview GUI, a user request to move a window from one workspace to another workspace. In response, processing logic adds the window to the other workspace (block 918) and resizes and repositions the resulting windows in the other workspace (block 920).

Figure 10:
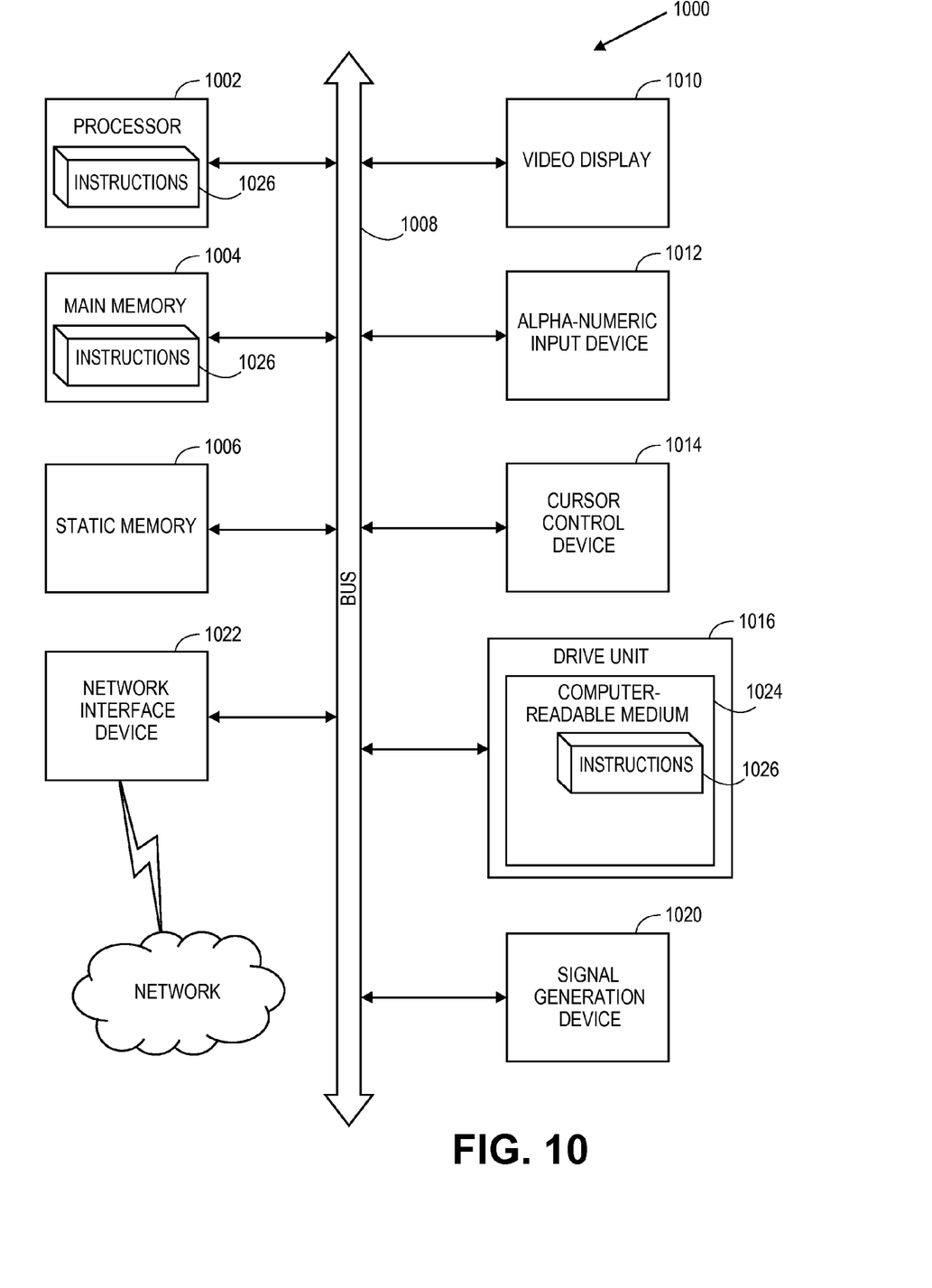
FIG. 10 is a block diagram of one embodiment of a computing system providing an integrated digital work environment.

FIG. 10 is a block diagram of one embodiment of a computing system providing an integrated digital work environment. Within the computing system 1000 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computing system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1016 (e.g., a data storage device in the form of a drive unit, which may include fixed or removable computer-readable storage medium), which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute instructions 1026 (e.g., an activity management tool 108 and/or a workspace management tool 110 of FIG. 1) for performing the operations and steps discussed herein.

The computer system 1000 may further include a network device 110 (e.g., NIC, Ethernet network card, etc.). The computer system 1000 also may include a video display unit 1010 (e.g., a liquid crystal display (LCD) or a cathode ray tube (CRT)) connected to the computer system through a graphics port and graphics chipset, an alphanumeric input device 1012 (e.g., a keyboard), a cursor control device 1014 (e.g., a mouse), and a signal generation device 1020 (e.g., a speaker).

The secondary memory 1016 may include a machine-readable storage medium (or more specifically a computer-readable storage medium) 1024 on which is stored one or more sets of instructions (e.g., an activity management tool 108 and/or a workspace management tool 110 of FIG. 1) embodying any one or more of the methodologies or functions described herein. The instructions 1026 (e.g., an activity management tool 108 and/or a workspace management tool 110 of FIG. 1) may also reside, completely or at least partially, within the main memory 1004 and/or within the processing device 1002 during execution thereof by the computer system 1000, the main memory 1004 and the processing device 1002 also constituting machine-readable storage media. The instructions 1026 (e.g., an activity management tool 108 and/or a workspace management tool 110 of FIG. 1) may further be transmitted or received over a network 1018 via the network device 110.

The computer-readable storage medium 1024 may also be used to store the instructions 1026 (e.g., an activity management tool 108 and/or a workspace management tool 110 of FIG. 1) persistently. While the computer-readable storage medium 1026 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "presenting," "activating," "increasing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for providing an activity management tool has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
displaying, on a screen of a computing system, a currently active window of one of a plurality of applications installed on the computing system, and a menu bar comprising an activities menu bar item;
receiving a user request for an overview of activities available to a user on the computing system in response to the user activating the activities menu bar item on the menu bar while interacting with the currently active window;
in response to the user request for the overview of the available activities, identifying, by the computing system, the available activities pertaining to the plurality of applications installed on the computing system, the plurality of installed applications comprising installed applications running on the computing system and one or more installed applications likely to be run on the computing system;
identifying, by the computing system, open windows of the installed applications running on the computing system, the open windows comprising the currently active window;
transitioning, by the computing system, from the displayed currently active window to a desktop environment represented by an activity overview graphical user interface (GUI) for presenting the overview of the available activities, the activity overview GUI having a first area and a second area, the first area comprising visual indicators of the installed applications running on the computing system and visual indicators of the installed applications likely to be run on the computing system, and the second area comprising the open windows of the installed applications running on the computing system, wherein transitioning from the displayed currently active window to the desktop environment represented by the activity overview GUI comprises including the currently active window in the second area in a resized form as one of the open windows; and
responsive to the user opening a new window of one of the installed applications, resizing, by a processing device of the computing system, the open windows, to have data within each of the open windows and data within the new window be simultaneously viewable in the second area.

2. The method of claim 1 wherein:
a transition from the currently active window to the activity overview GUI is animated.

3. The method of claim 1 wherein:
the user request for the activity overview is received upon the user activating any one of a hardware menu button, a designating keyboard key or a designated control on a top menu bar, or upon the user placing a cursor in a designated region in the first area; and
responsive to the user request for the activity overview, the visual indicators of the installed applications running on the computing system, the visual indicators of the installed applications likely to be run on the computing system, and the open windows of the installed applications are displayed on the screen of the computing system as part of the desktop environment.

4. The method of claim 1 wherein identifying, by the computing system, the available activities comprises:
receiving user input specifying favorite applications of the user; and
adding the favorite applications to a list of user activities.

5. The method of claim 1 wherein identifying, by the computing system, the available activities comprises:
automatically determining favorite applications of the user based on frequency of use; and
adding the favorite applications to a list of user activities.

6. The method of claim 1 wherein each of the visual indicators of the running applications and the applications likely to be run in the future graphically illustrates a function or a brand of a respective application, and a state of the respective application, the state of the application comprising any one of inactive, active with a single open window, active with multiple open windows, active with one or more messages, or active with window urgency.

7. The method of claim 6 further comprising:
detecting user activation of a visual indicator of an application in the first area;
determining whether the application is currently running;
if the application is not currently running, adding a window for the application in the second area; and
if the application is currently running, activating a most recently used window of the application.

8. The method of claim 6 further comprising:
receiving a user request for an application menu associated with an application having a plurality of open windows;
displaying the application menu next to a visual indicator of the application, the application menu including a list of open windows of the application and an option to create a new window for the application;
as the user moves the cursor through the list of windows, highlighting or increasing the size of a corresponding window in the second area; and
upon a user selection of a window from the list of windows, activating the selected window.

9. The method of claim 1 further comprising:
receiving a user request for an application switcher;
displaying a list of active applications ordered by time of last use; and
allowing the user to view a list of open windows for an application.

10. A computer readable storage medium including instructions that, when executed by a computing system, cause the computing system to perform a set of operations comprising:
displaying, on a screen of the computing system, a currently active window of one of a plurality of applications installed on the computing system, and a menu bar comprising an activities menu bar item;
receiving a user request for an overview of activities available to a user on the computing system in response to the user activating the activities menu bar item on the menu bar while interacting with the currently active window;
in response to the user request for the overview of the available activities, identifying, by the computing system, the available activities pertaining to the plurality of applications installed on the computing system, the plurality of installed applications comprising installed applications running on the computing system and one or more installed applications likely to be run on the computing system;

identifying, by the computing system, open windows of the installed applications running on the computing system, the open windows comprising the currently active window;

transitioning, by the computing system, from the displayed currently active window to a desktop environment represented by an activity overview graphical user interface (GUI) for presenting the overview of the available activities, the activity overview GUI having a first area and a second area, the first area comprising visual indicators of the installed applications running on the computing system and visual indicators of the installed applications likely to be run on the computing system, and the second area comprising the open windows of the installed applications running on the computing system, wherein transitioning from the displayed currently active window to the desktop environment represented by the activity overview GUI comprises including the currently active window in the second area in a resized form as one of the open windows; and responsive to the user opening a new window of one of the installed applications, resizing, by a processing device of the computing system, the open windows, to have data within each of the open windows and data within the new window be simultaneously viewable in the second area.

11. The computer readable storage medium of claim 10 wherein:
a transition from the currently active window to the activity overview GUI is animated.

12. The computer readable storage medium of claim 10 wherein each of the visual indicators of the running applications and the applications likely to be run in the future graphically illustrates a function or a brand of a respective application, and a state of the respective application, the state of the application comprising any one of inactive, active with a single open window, active with multiple open windows, active with one or more messages, or active with window urgency.

13. The computer readable storage medium of claim 12 wherein the set of operations further comprises:
detecting user activation of a visual indicator of an application in the first area;
determining whether the application is currently running;
if the application is not currently running, adding a window for the application in the second area; and
if the application is currently running, activating a most recently used window of the application.

14. The computer readable storage medium of claim 12 wherein the set of operations further comprises:
receiving a user request for an application menu associated with an application having a plurality of open windows;
displaying the application menu next to a visual indicator of the application, the application menu including a list of open windows of the application and an option to create a new window for the application;
as the user moves the cursor through the list of windows, highlighting or increasing the size of a corresponding window in the second area; and
upon a user selection of a window from the list of windows, activating the selected window.

15. The computer readable storage medium of claim 10 wherein the set of operations further comprises:
receiving a user request for an application switcher;
displaying a list of active applications ordered by time of last use; and
allowing the user to view a list of open windows for an application.

16. A computing system comprising:
a memory;
a display device, coupled to the memory, to display a currently active window of one of a plurality of applications installed on the computing system, and a menu bar comprising an activities menu bar item;
at least one processor coupled to the memory and the display device; and
an operating system executed by the at least one processor to:
receive a user request for an overview of activities available to a user on the computing system in response to the user activating the activities menu bar item on the menu bar while interacting with the currently active window;
identify the available activities pertaining to the plurality of applications installed on the computing system, the plurality of installed applications comprising installed applications currently running on the computing system and one or more installed applications likely to be run on the computing system in the future;
identify open windows of the installed applications running on the computing system, the open windows comprising the currently active window;
transition, on the display device, from the displayed currently active window to a desktop environment represented by an activity overview graphical user interface (GUI) having a first area and a second area, the first area comprising visual indicators of the installed applications currently running on the computing system and the installed applications likely to be run on the computing system in the future, and the second area comprising the open windows of the installed applications currently running on the computing system, wherein transitioning from the displayed currently active window to the desktop environment represented by the activity overview GUI comprises including the currently active window in the second area in a resized form as one of the open windows; and
responsive to the user opening a new window of one of the installed applications, resize the open windows, to have data within each of the open windows and data within the new window be simultaneously viewable in the second area.

17. The system of claim 16 wherein each of the visual indicators of the currently running applications and the applications likely to be run in the future graphically illustrates a function or a brand of a respective application, and a state of the respective application, the state of the application comprising any one of inactive, active with a single open window, active with multiple open windows, active with one or more messages, or active with window urgency.

18. The system of claim 17 wherein the activity overview GUI is to:
detect user activation of a visual indicator of an application in the first area;
determining whether the application is currently running;
if the application is not currently running, add a window for the application in the second area; and
if the application is currently running, activate a most recently used window of the application.

19. The system of claim 17 wherein the activity overview GUI is to:

receive a user request for an application menu associated with an application having a plurality of open windows;

display the application menu next to a visual indicator of the application, the application menu including a list of open windows of the application and an option to create a new window for the application;

as the user moves the cursor through the list of windows, highlight or increase the size of a corresponding window in the second area; and upon a user selection of a window from the list of windows, activate the selected window.

20. The system of claim 16 wherein the activity overview GUI is to:

receive a user request for an application switcher;

display a list of active applications ordered by time of last use; and allow the user to view a list of open windows for an application.

\* \* \* \* \*